US009065639B2

(12) United States Patent
Tanaka et al.

(10) Patent No.: US 9,065,639 B2
(45) Date of Patent: Jun. 23, 2015

(54) DEVICE FOR GENERATING ENCRYPTION KEY, METHOD THEREOF AND COMPUTER READABLE MEDIUM

(71) Applicant: KABUSHIKI KAISHA TOSHIBA, Minato-ku, Tokyo (JP)

(72) Inventors: Yasuyuki Tanaka, Kanagawa-ken (JP); Mitsuru Kanda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/687,040

(22) Filed: Nov. 28, 2012

(65) Prior Publication Data

US 2013/0145149 A1    Jun. 6, 2013

(30) Foreign Application Priority Data

Dec. 2, 2011  (JP) ................... 2011-264927

(51) Int. Cl.
  *H04L 9/32*  (2006.01)
  *H04L 9/08*  (2006.01)
  *H04L 9/14*  (2006.01)

(52) U.S. Cl.
  CPC ............ *H04L 9/0838* (2013.01); *H04L 9/3202* (2010.01); *H04L 9/14* (2013.01); *H04L 9/321* (2013.01)

(58) Field of Classification Search
  None
  See application file for complete search history.

(56) References Cited

U.S. PATENT DOCUMENTS

| 6,697,945 | B2* | 2/2004 | Ishiguro et al. | 713/171 |
|---|---|---|---|---|
| 7,382,883 | B2* | 6/2008 | Cross et al. | 380/281 |
| 8,588,425 | B1* | 11/2013 | Harwood et al. | 380/286 |
| 2003/0217046 | A1* | 11/2003 | Yuan et al. | 707/3 |
| 2008/0219449 | A1* | 9/2008 | Ball et al. | 380/277 |
| 2012/0294440 | A1* | 11/2012 | Little et al. | 380/44 |
| 2012/0303961 | A1* | 11/2012 | Kean et al. | 713/171 |

FOREIGN PATENT DOCUMENTS

| WO | WO 2004028071 A1 * | 4/2004 |
|---|---|---|
| WO | 2011064868 | 6/2011 |

OTHER PUBLICATIONS

Aboba et al, Extensible Authentication Protocol (EAP) Key Management Framework, Internet Engineering Task Force, Request for Comments, 5191.
Forsberg et al, Protocol for Carrying Authentication for Network Access (PANA), Internet Engineering Task Force, Request for Comments, 5247.

* cited by examiner

*Primary Examiner* — Jeffrey Pwu
*Assistant Examiner* — Wasika Nipa
(74) *Attorney, Agent, or Firm* — Amin, Turocy & Watson, LLP

(57) ABSTRACT

There is provided an authentication device in which a network access authenticating unit executes a first network access authentication process with a communication device; master key generator generates a first master key shared with the communication device in accordance with a result of the first network access authentication process; an application-oriented encryption key generator generates a first encryption key for an application, which is shared with the communication device, on the basis of the first master key; a master key identifier determiner determines an identifier of the first master key; and an application-oriented encryption key identifier determiner determines an identifier of the first encryption key for the application in accordance with the identifier of the first master key.

11 Claims, 4 Drawing Sheets

DEVICE FOR GENERATING ENCRYPTION KEY, METHOD THEREOF AND COMPUTER READABLE MEDIUM

CROSS REFERENCE TO RELATED APPLICATIONS

This application is based upon and claims the benefit of priority from the prior Japanese Patent Application No. 2011-264927, filed on Dec. 2, 2011, the entire contents of which are incorporated herein by reference.

FIELD

Embodiments described herein relate to an authentication device, an authentication method and a computer readable medium storing an authentication program for executing a network access authentication process.

BACKGROUND

There is a method of generating an encryption key for an application from a master key. This method does not, however, mention how to distinguish the encryptions key for the application from others. Therefore, it may cause a problem that if a plurality of encryption keys for the applications exists simultaneously, the respective encryption keys for the applications cannot be distinguished from each other.

DETAILED DESCRIPTION

According to some embodiments, there is provided an authentication device including a network access authenticating unit, a master key generator, an application-oriented encryption key generator, a master key identifier determiner and an application-oriented encryption key identifier determiner.

The network access authenticating unit executes a first network access authentication process with a communication device.

The master key generator generates a first master key shared with the communication device in accordance with a result of the first network access authentication process.

The application-oriented encryption key generator generates a first encryption key for an application, which is shared with the communication device, on the basis of the first master key.

The master key identifier determiner determines an identifier of the first master key.

The application-oriented encryption key identifier determiner determines an identifier of the first encryption key for the application in accordance with the identifier of the first master key.

Figure 1:
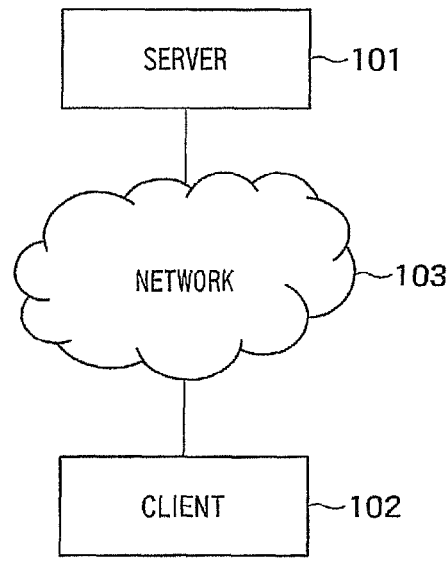
FIG. 1 is a view illustrating architecture of a network including a server according to one embodiment.

Embodiments will hereinafter be described with reference to the drawings.
[First Embodiment]
FIG. 1 illustrates a network system including a server (authentication device) 101 according to a first embodiment.

This network system includes the server 101, a client (communication device) 102 and a network 103.

When the client 102 connects to the network 103, network access authentication process is performed between the server 101 and the client 102. The server 101 carries out the authentication process by a predetermined authentication method on the basis of a pre-shared key or a password or an electronic certificate, etc. An assumption in the first embodiment is that the PANA protocol defined by RFC5191 is used as a network access authentication protocol. However, the protocol for use is not limited to the PANA protocol.

When the client 102 is approved through the authentication by the server 101, the same master key is generated in both of the server 101 and the client 102 according to specifications (key generation algorithm etc.) of the authentication method. For example, both of the server 101 and the client 102 generate the same master key based on a value of the authentication result and a master key generation function shared beforehand with each other. Further, the both generate, from the master key, the same encryption key for an application on the basis of an encryption key generation function for the application that is previously shared with each other.

The client 102 and the server 101 perform communications for the application concerned by use of the encryption key for the application. Note that the encryption key for the application is sent securely to another device unillustrated herein on the network 103 from the server 101 after being approved through the authentication, and the encrypted communications can be performed by use of the encryption key for the application between another device and the client 102. It is to be noted that the master key is employed for generating the encryption key for the application but is not used as the encryption key for the actual communications in the first embodiment. However, the invention is not limited to this scheme.

The authentication process between the server 101 and the client 102 is periodically conducted, and the master key and the encryption key for the application are generated each time the authentication process is redone (re-authentication). The authentication process is redone before a period of validity of the last authentication expires. Hence, there is a period for which a pair of the master key and the encryption key for the application based on the authentication process of the last time and another pair of the master key and the encryption key for the application process based on the authentication of this time simultaneously exist. Accordingly, for this coexistence period, there is a necessity for distinguishing master key identifiers and the encryption keys for the applications from each other. Further, other than the re-authentication, such a possibility exists that two or more authentication processes are conducted in parallel between the server 101 and the client 102, and in this case also the master keys and the encryption keys for the applications need distinguishing from each other between the two or more authentications.

As to the master key, the server 101 hitherto determines the master key identifier not to be overlapped and notifies the client 102 of the determined key identifier. Therefore, the master keys are distinguishable between that of the last time and that of this time on the basis of master key identifiers thereof. Any distinguishing method for the encryption key for the application does not, however, exist. The first embodiment solves this problem and discloses the server and the method by which a plurality of encryption keys for the applications can be distinguished from each other.

Figure 2:
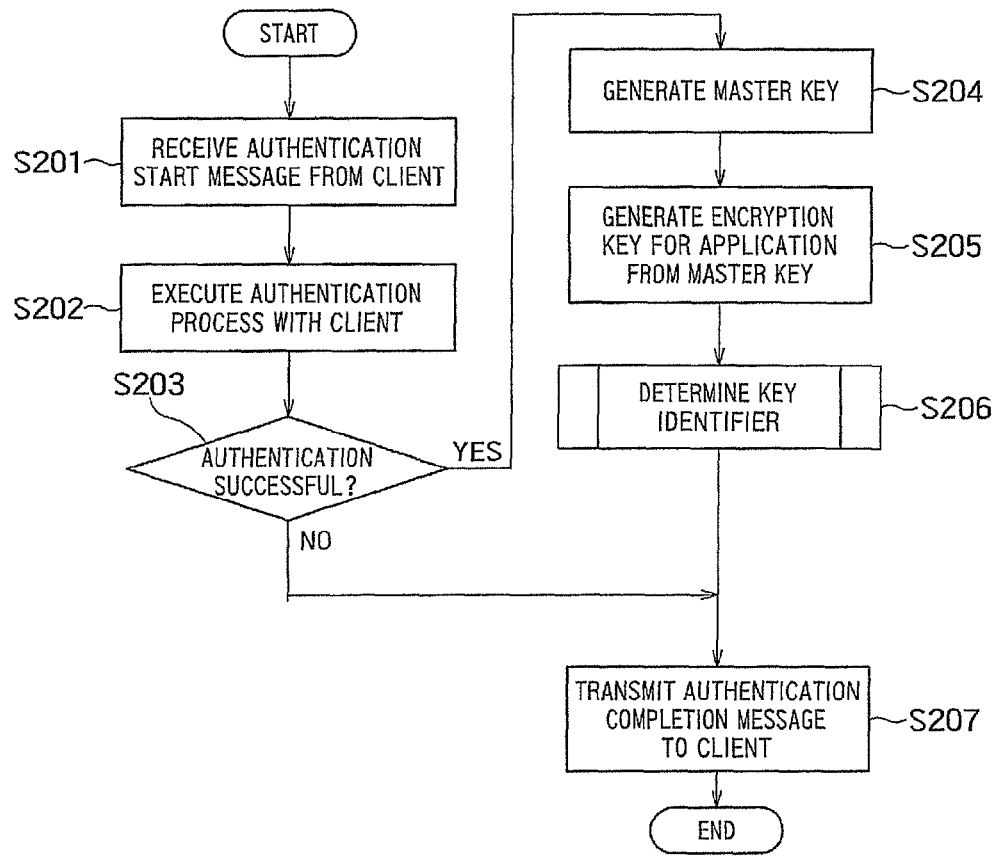
FIG. 2 is a flowchart illustrating a flow of an authentication process of the server.

FIG. 2 is a flowchart schematically illustrating a flow of an authentication process executed by the server 101.

The server 101, when receiving an authentication start message from the client 102 (S201), executes a network access authentication process with the client 102 (S202). The authentication process is categorized by a case where the client 102 connects to the server 101 for the first time, a case of making the re-authentication, a case of conducting an additional authentication when one or more authentications have already existed, and so on. Note that though there is also a case of executing the network access authentication process (S202) without receiving the authentication start message from the client 102, this case is herein omitted.

If the authentication process gets unsuccessful due to discrepancy of the pre-shared key or the discrepancy of the password etc. (NO in S203), an authentication completion message is transmitted to the client 102, and the client 102 is thus notified of a purport of having failed in the authentication process (S207).

If the authentication process gets successful (YES in S203), the master key is generated based on the value obtained as a result of the authentication process (S204), and further the encryption key for the application is generated from the master key (S205).

An arbitrary method of generating the encryption key for the application from the master key is available, and a variety of methods can be used. The value obtained as the result of the authentication process is shared with both of the server 101 and the client 102, and the client 102 also generates the same master key from this value as the server 101 generates. Moreover, a generation algorithm of the encryption key for the application is also shared with the both, and the client 102 also generates the same encryption key for the application from the same master key as the server 101 generates.

Note that the master key in the present application is, if generated based on the authentication result, not restricted to any specified type of key. The master key may correspond to any one of, e.g., a master session key (MSK) and an extended master session key (EMSK).

Further, the encryption key for the application may be, as far as it is generated from the master key, a key generated from the master key directly (based on a parent-child relationship) or indirectly (based on a parent-grandchild relationship). For instance, when the master key corresponds to the EMSK, the encryption key for the application may be a root key on a per use-case basis (USRK (Usage-Specific Root Key) for use case A, USRK for use case B), which is generated directly from the EMSK, and may also be a key generated further from the USRK. For example, when the USRK is SMMK (USRK for Smart Meter), the encryption key for the application may be the SMMK and may also be SMK-HH (Smart Meter Key for hop-by-hop protection) and SMK-EE (Smart Meter Key for End-to-End protection), which are generated from the SMMK, respectively.

Next, the server 101 determines a master key identifier and an encryption key identifier for the application (S206). The master key identifier and the encryption key identifier for the application are determined so as not to be overlapped with the identifiers in use at the present. The encryption key identifier for the application is determined corresponding to a value of the master key identifier. The server 101 stores the determined master key identifier and encryption key identifier for the application in the way of being associated respectively with the master key and the encryption key for the application generated this time, and thus manages these identifiers.

The server 101 transmits an authentication completion message containing the determined master key identifier to the client 102 and notifies the client 102 of a purport of having succeeded in the authentication process. The notification of the master key identifier may be given as contained in a message different from the authentication completion message.

The encryption key identifier for the application may not be contained in the authentication completion message. That is, the encryption key identifier for the application may not be notified to the client 102. In this case, the client 102 and the server 101 share a generation function of the encryption key identifier for the application with each other beforehand, in which the client 102 generates the same encryption key identifier for the application as the key of the server 101 from the master key identifier of which the server 101 notified in accordance with this generation function. Accordingly, there is no necessity for adding any changes to a conventional sequence of the messages transmitted and received between the client 102 and the server 101 and conventional contents of the messages. Hence, the implementation is facilitated.

The client 102 stores the master key identifier and the encryption key identifier for the application in the way of being associated with the master key and the encryption key for the application that are generated this time, and thus manages the identifiers.

Figure 3:
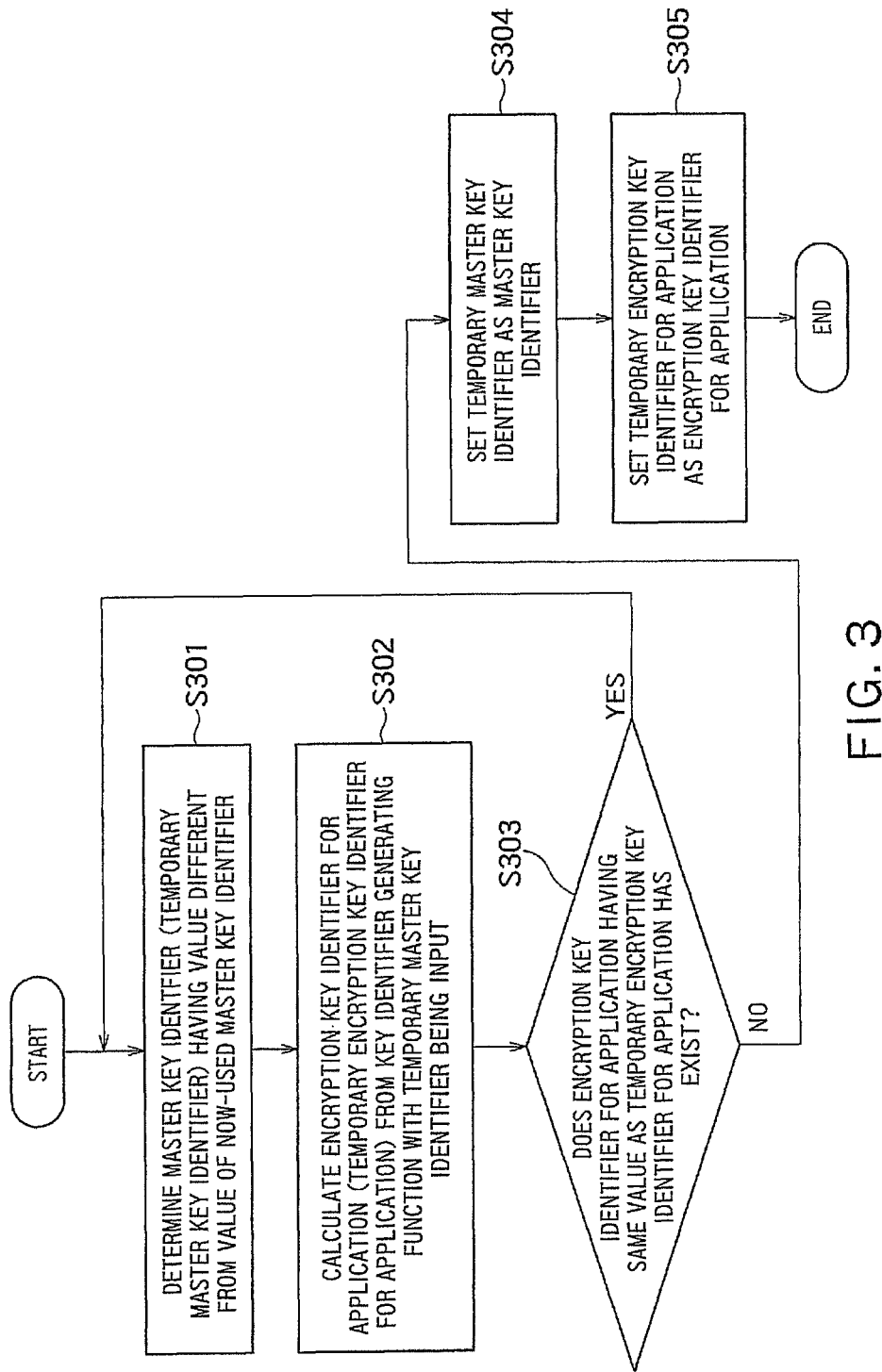
FIG. 3 is a flowchart illustrating a flow of a key identifier determination process by way of one example.

FIG. 3 illustrates a detailed flow of a key identifier determination process in step S206 of FIG. 2.

To begin with, a value different from the master key identifier (present master key identifier) in use at the present between the server 101 and the client 102 is selected and set as a temporary master key identifier (S301). Note that what is considered about the master key identifier is a case of permitting the same value with a different client and a case of not permitting, however, the example of the present processing flow can be applied to both of the cases.

Next, a temporary application master key identifier is generated from the temporary master key identifier by use of a generation function of an encryption key identifier for an application with an input being a value of the same length as that of the temporary master key identifier and with an output being a value of the same length as that of the application encryption key identifier (S302). For instance, the master key identifier has 32 bits, and the application encryption key identifier has 8 bits, in which case the generation function of the encryption key identifier for the application is considered to be such a function that low-order 8 bits of the input (temporary master key identifier) are output.

Then, it is checked whether the same encryption key identifier for the application as the calculated temporary application encryption key identifier exists or not (S303). Incidentally, what is considered about the application encryption key identifier is the case of permitting the same value with the different client and the case of not permitting. However, the example of the present processing flow can be applied to both of the cases. At least, the application encryption key identifier needs not to be overlapped with respect to the same client.

If the same encryption key identifier for the application exists (NO), the processing loops back to step S301, in which the temporary master key identifier is regenerated.

Whereas if not (YES), the temporary master key identifier is determined to be the master key identifier (S304). Further, the temporary encryption key identifier for the application is determined as the encryption key identifier for the application (S305).

The generation function of the encryption key identifier for the application described above is just an example and may also be a function other than this type of function.

Moreover, the key identifiers, which should be compared in steps S301 and S303, differ depending on effective scopes of the master key identifier and the encryption key identifier for the application. Namely, the key identifiers, which should be compared in steps S301 and S303, differ depending on whether these key identifiers are sufficient if unique only between the server 101 and the client 102 or depending on if the identifiers must be unique among all the nodes connected to the network 103.

Figure 4:
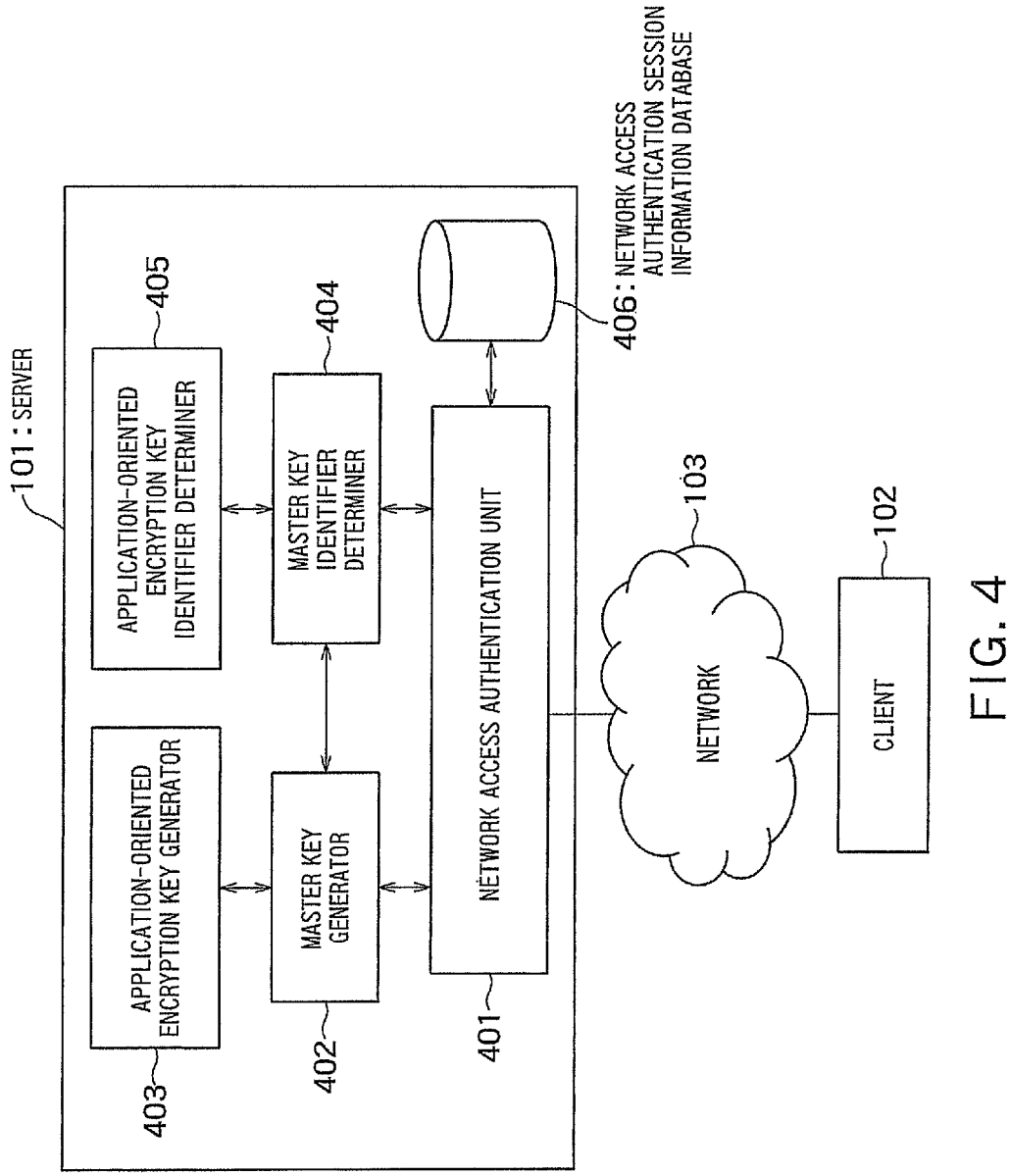
FIG. 4 is a diagram of a configuration of the server according to one embodiment.

FIG. 4 illustrates a diagram of a configuration of the server 101.

The server 101 includes a network access authenticating unit 401, a master key generator 402, an application-oriented encryption key generator 403, a master key identifier determiner 404, an application-oriented encryption key identifier determiner 405 and a network access authentication session information database (storage) 406.

The network access authenticating unit 401 executes the network access authentication process between the server 101 and the client 102 by using an authentication method and the PANA protocol that are set beforehand. This network access authentication process includes notifying the client of the master key identifier and also, as the necessity may arise, the encryption key identifier for the application. Concretely, this involves executing the processes in steps S201, S202, S203, S206 and S207 in the processing flow of FIG. 2. In step S206, especially the processes in steps S303, S304 and S305 in the processing flow of FIG. 3 are executed.

The master key generator 402 generates the master key corresponding to a result of the network access authentication process. That is, the master key generator 402, when the network access authentication process is permitted, generates the master key according to the specifications (key generation algorithm) of the authentication method. The master key generator 402 executes, e.g., the process in step S204 in the processing flow of FIG. 2.

The application-oriented encryption key generator 403 generates the encryption key for the application from the master key by employing the preset encryption key function for the application. The application-oriented encryption key generator 403 executes, e.g., the process in step S205 in the processing flow of FIG. 2.

The master key identifier determiner 404 determines the master key identifier through the processes illustrated in FIG. 3, and the application-oriented encryption key identifier determiner 405 generates the encryption key identifier for the application. The application-oriented encryption key identifier determiner 405 executes, e.g., the process in in step S206 in the processing flow of FIG. 2, particularly the processes in steps S301 and S302 in the processing flow of FIG. 3.

The first embodiment discussed above has exemplified the example of generating one encryption key for the application from one master key, and generating the encryption key identifier for the application from one master key identifier. However, there could be a case of generating a plurality of encryption keys for the applications from one master key. In this case, the identifiers are required to be determined for the respective encryption keys for the applications. In this case also, basically, the plurality of encryption key identifiers for the applications may be generated from one master key identifier with the same idea as in the process described above.

For example, in the case of generating the two encryption keys for the applications from one master key, it follows that the processes in steps S302, S303 and S305 of FIG. 3 are carried out for each encryption key for the application. To be specific, after determining the temporary master key identifier in step S301, a temporary application-oriented key identifier a of an application-oriented encryption key A and a temporary application-oriented key identifier b of an application-oriented encryption key B are determined in step S302. The determination in step S303 is made with respect to the key identifiers a and b, and, if any problem does not arise, the temporary master key identifier and the temporary application-oriented key identifiers a and b are determined to be the fixed master key identifier and the fixed key identifiers for the applications (S304, S305).

Note that the authentication device, though existing as the server 101 independently on the network 103 in the first embodiment, may be built in a gateway (access server) that can exist between the client 102 and the network 103. The access server has a role of, before the authentication device approves the authentication, permitting the client to perform only the communications limited to the authentication with the server and, after approving the authentication, permitting free accesses to the network 103.

According to the first embodiment discussed above, the identifier can be allocated to the encryption key for the application, and hence the plurality of encryption keys for the applications can be distinguished from each other.

Further, the encryption key identifier for the application is determined corresponding to the master key identifier, and it is therefore feasible to eliminate the necessity for notifying the client of the encryption key identifier for the application. Namely, the generation function of the encryption key identifier for the application described above is shared with the client, and, with this sharing, the client is simply notified of the master key identifier as hitherto done and thereafter can determine the encryption key identifier for the application by itself afterward. Accordingly, it is possible to omit notifying the client of the encryption key identifier for the application, and there is no necessity for adding any changes to the conventional message sequence or the contents of the message.

[Second Embodiment]

A second embodiment is different from the first embodiment in terms of how the key identifier determining process in step S206 of FIG. 2 is executed.

Figure 5:
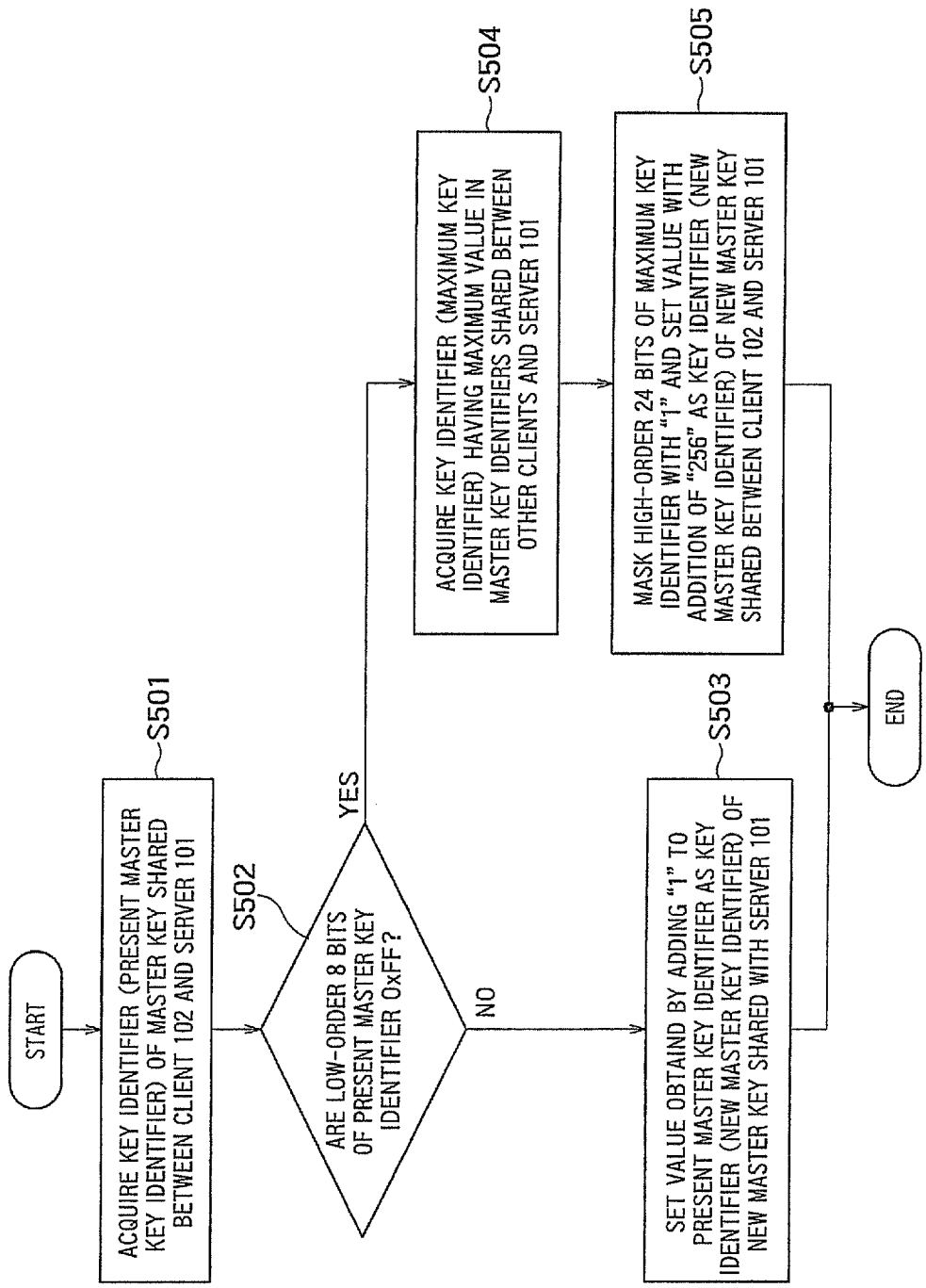
FIG. 5 is a flowchart illustrating the flow of the key identifier determination process by way of another example.

FIG. 5 shows a flow of the key identifier determining process in the second embodiment. The second embodiment is based on the premise that a bit space for the master key identifier is a 32-bit space, and a bit space for the encryption key identifier for the application is an 8-bit space. Further, the master key identifier is to be unique for each of clients.

At first, the identifier of the master key in use at the present (present master key identifier) between the server 101 and the client 102 is specified (S501).

Next, it is determined whether or not the low-order 8 bits (a predetermined number of low-order bits in the bit string of the present master key identifier) of the present master key identifier are 0xFF ("11111111") (S502). The processing advances to step S503 if the low-order 8 bits are not 0xFF and advances to step S504 whereas if being 0xFF. Moreover, in a status where the client 102 connects to the server for the first time, when the present master key identifier does not yet exist, the processing also advances to step S504.

In step S503, a value obtained by adding a predetermined value, i.e., "1" given herein, smaller than the maximum value expressible by a bit count of the predetermined number of low-order bits to the present master key identifier, is determined as the key identifier of the master key (the master key generated in S204 of FIG. 2) shared newly between the server 101 and the client 102 (S503). The key identifier determined herein is called a new master key identifier. Further, the low-order 8 bits of the new master key identifier are determined as the encryption key identifier for the application. The client 102 also determines the low-order 8 bits of the master key identifier (the new master key identifier) of which the server 101 notifies, are determined as the encryption key identifier for the application.

Whereas when the low-order 8 bits are 0xFF ("11111111"), there is specified the master key identifier having the maximum value in the master key identifiers of the master keys shared with other clients (S504). Specifically, the master key identifier having the maximum value of a high-order 24-bit field is specified by comparing the high-order 24-bit fields with each other. Herein, the master key identifier specified herein is called a "maximum key identifier".

The high-order 24 bits of the maximum key identifier are masked with "1", the low-order 8 bits thereof are masked with "0", and "256" is added to the masked value of "1"s and "0"s, and a resultant value is set as an identifier of the new master key identifier (new master key identifier). Namely, the value, which is obtained by adding "1" to the high-order 24 bits of the maximum key identifier and setting "0" in all the low-order 8 bits, is set as the new master key identifier. Furthermore, the low-order 8 bits of the new master key identifier are determined as the encryption key identifier for the application. The client 102 also determines, as the encryption key identifier for the application, the low-order 8 bits of the master key identifier (the new master key identifier) which the server 101 notifies of.

According to the second embodiment discussed above, the new master key identifier is determined in a way that adds "1" to the present master key identifier, the low-order 8 bits of the new master key identifier are set as the encryption key identifier for the application, and hence the non-overlapped encryption key identifier for the application can be simply determined.

The server described above may also be realized using a general-purpose computer device as basic hardware. That is, processing on the blocks of the server can be realized by causing a processor mounted in the above described computer device to execute a program. In this case, the server may be realized by installing the above described program in the computer device beforehand or may be realized by storing the program in a storage medium such as a CD-ROM or distributing the above described program over a network and installing this program in the computer device as appropriate.

The invention claimed is:

1. An authentication device including a processor, comprising:
a network access authenticating unit configured to execute a first network access authentication process with a communication device;
a master key generator configured to generate a first master key shared with the communication device in accordance with a result of the first network access authentication process;
an application-oriented encryption key generator configured to generate a first encryption key for an application, which is shared with the communication device, on the basis of the first master key;
a master key identifier determiner configured to determine an identifier to be allocated to the first master key; and
an application-oriented encryption key identifier determiner configured to generate an identifier to be allocated to the first encryption key by using the identifier assigned to the first master key, the identifier of the first encryption key having bit length different from that of the identifier of the first master key,
wherein the network access authenticating unit executes a second network access authentication process with the communication device,
the master key generator generates a second master key shared with the communication device in accordance with a result of the second network access authentication process,
the application-oriented encryption key generator generates a second encryption key for an application, which is shared with the communication device, on the basis of the second master key,
the master key identifier determiner determines an identifier to be allocated to the second master key to be a value different from the identifier of the first master key, and
the application-oriented encryption key identifier determiner generates an identifier to be allocated to the second encryption key by using the identifier of the second master key, the identifier of the second encryption key having bit length different from that of the identifier of the second master key
the processor compares the identifier of the second encryption key with the identifier of the first encryption key,
the master key identifier determiner calculates another identifier to be allocated to the second master key, said other identifier having a value which is different from the identifier of the first master key,
the application-oriented encryption key identifier determiner generates an identifier to be allocated to the second encryption key by using said other identifier of the second master key,
the processor compares said other identifier of the second encryption key with the identifier of the first encryption key,
until an identifier of the second encryption key which is different from the identifier of the first encryption key is obtained, processes of comparing with the identifier of the first encryption key, generating an identifier to be allocated to the second master key and generating an identifier to be allocated to the second encryption key are repeated.

2. The authentication device according to claim 1, wherein the master key identifier determiner determines the identifier of the second master key so that the identifier of the second encryption key is calculated as a value different from the identifier of the first encryption key.

3. The authentication device according to claim 1, wherein the application-oriented encryption key identifier determiner uses identifier generation function, an input of said key identifier generation function being a value of a master key identifier and an output thereof being a value of an encryption key identifier, to calculate the identifier of the first encryption key from the identifier of the first master key and calculate the identifier of the second encryption key from the identifier of the second master key.

4. The authentication device according to claim 1, wherein the network access authenticating unit notifies the communication device of the identifier of the first master key and the identifier of the second master key but does not notify the communication device of the identifier of the first encryption key and identifier of the second encryption key.

5. The authentication device according to claim 1, wherein a bit length of an identifier of an encryption key for an application is smaller than a bit length of an identifier of a master key, the application-oriented encryption key identifier determiner generates the identifier of the first encryption key as a value of a predetermined number of low-order bits in a bit string of the identifier of the first master key, and generates the identifier of the second encryption key as a value of the predetermined number of low-order bits in a bit string of the identifier of the second master key.

6. The authentication device according to claim 5, wherein the master key identifier determiner adds a predetermined value to the identifier of the first master key to obtain the identifier of the second master key, the predetermined value being smaller than a maximum value expressible by a bit count of the predetermined number of low-order bits.

7. An authentication method comprising:
executing a first network access authentication process with a communication device;
generating a first master key shared with the communication device in accordance with a result of the first network access authentication process;
generating a first encryption key for an application, which is shared with the communication device, on the basis of the first master key;
determining an identifier to be allocated to the first master key;
generating an identifier to be allocated to the first encryption key by using the identifier of the first master key, the identifier of the first encryption key having bit length different from that of the identifier of the first master key;
executing a second network access authentication process with the communication device;
generating a second master key shared with the communication device in accordance with a result of the second network access authentication process;
generating a second encryption key for an application, which is shared with the communication device, on the basis of the second master key;
determining an identifier to be allocated to the second master key to be a value different from the identifier of the first master key;
generating an identifier to be allocated to the second encryption key in accordance with the identifier of the second master key, the identifier of the second encryption key having bit length different from that of the identifier of the second master key;
comparing the identifier of the second encryption key with the identifier of the first encryption key;
calculating another identifier to be allocated to the second master key, said other identifier having a value which is different from the identifier of the first master key;
generating an identifier to be allocated to the second encryption key by using said other identifier of the second master key;
comparing said other identifier of the second encryption key with the identifier of the first encryption key; and
repeating processes of comparing with the identifier of the first encryption key, generating an identifier to be allocated to the second master key and generating an identifier to be allocated to the second encryption key are repeated, until an identifier of the second encryption key which is different from the identifier of the first encryption key is obtained.

8. A non-transitory computer readable medium having stored therein instructions, which when executed by a processor, causes the processor to execute steps, comprising:
executing a first network access authentication process with a communication device;
generating a first master key shared with the communication device in accordance with a result of the first network access authentication process;
generating a first encryption key for an application, which is shared with the communication device, on the basis of the first master key;
determining an identifier to be allocated to the first master key;
generating an identifier to be allocated to the first encryption key in accordance with the identifier of the first master key, the identifier of the first encryption key having bit length different from that of the identifier of the first master key;
executing a second network access authentication process with the communication device;
generating a second master key shared with the communication device in accordance with a result of the second network access authentication process;
generating a second encryption key for an application, which is shared with the communication device, on the basis of the second master key;
determining an identifier to be allocated to the second master key to be a value different from the identifier of the first master key;
generating an identifier to be allocated to the second encryption key in accordance with the identifier of the second master key, the identifier of the second encryption key having bit length different from that of the identifier of the second master key;
comparing the identifier of the second encryption key with the identifier of the first encryption key ;
calculating another identifier to be allocated to the second master key, said other identifier having a value which is different from the identifier of the first master key;
generating an identifier to be allocated to the second encryption key by using said other identifier of the second master key;
comparing said other identifier of the second encryption key with the identifier of the first encryption key; and
repeating processes of comparing with the identifier of the first encryption key, generating an identifier to be allocated to the second master key and generating an identifier to be allocated to the second encryption key are repeated, until an identifier of the second encryption key which is different from the identifier of the first encryption key is obtained.

9. The authentication device according to claim 1, the bit length of the identifier of the first encryption key is shorter than that of the identifier of the first master key.

10. The authentication device according to claim 1, wherein the network access authenticating unit sends the identifier of the first master key to the communication device and does not send the identifier of the first encryption key to the communication device.

11. The authentication device according to claim 1, wherein a pair of the first master key and the first encryption key coexists with a pair of the second master key and the second encryption key before a period of a validity of the first network access authentication expires.

* * * * *